United States Patent [19]

Richards

[11] 3,789,151

[45] Jan. 29, 1974

[54] SOLID STATE CROSSPOINT SWITCH

[75] Inventor: Glenn L. Richards, Caledonia, N.Y.

[73] Assignee: Stromberg-Carlson Corporation, Rochester, N.Y.

[22] Filed: Mar. 6, 1972

[21] Appl. No.: 232,031

[52] U.S. Cl. .......................... 179/18 GF, 340/166 R

[51] Int. Cl. .............................................. H04q 3/50

[58] Field of Search .............. 179/18 GF; 340/166 R

[56] References Cited

UNITED STATES PATENTS

| | | | |
|---|---|---|---|
| 3,550,088 | 12/1970 | Jones | 179/18 GF |
| 3,662,117 | 5/1972 | Bhatt et al. | 179/18 GF |
| 3,593,296 | 7/1971 | Girard et al. | 179/18 GF |
| 3,720,792 | 3/1973 | Resta | 179/18 GF |

*Primary Examiner*—Thomas W. Brown
*Attorney, Agent, or Firm*—William F. Porter, Jr.

[57] ABSTRACT

A solid state crosspoint switch particularly suited for use in a telephone switching matrix utilizes two switching transistors and two compensating transistors in a balanced bridge configuration to substantially eliminate crosstalk while the switch is effectively open (all four transistors cut off to provide a high impedance for blocking the passage of audio signals therethrough). Audio signals are enabled to pass through the crosspoint switch via a low impedance path by driving the two switching transistors into saturation from a gated control circuit responsive to appropriate control signals.

10 Claims, 5 Drawing Figures

SOLID STATE CROSSPOINT SWITCH

BACKGROUND OF THE INVENTION

The subject invention relates generally to matrix crosspoint switches and specifically to those switches employing solid state components.

Switching matrices are used in many varied applications, the establishment of telephone connections being one of the most prevalent. A switching matrix performs the function of completing a path between a selected one of a plurality of input leads and a selected one of a plurality of output leads. Thus in a telephone system a calling subscriber line is connected to the called subscriber line via the usual tip and ring leads, comprising a lead pair, through a selected path in the telephone switching matrix. The normal telephone switching matrix comprises a vast number of crosspoint switches, viz. the switching devices for connecting one lead to another in routing a call through the matrix. The actual number of switches depends on the type and size of matrix used which is dependent on the number of subscribers and pieces of equipment to be serviced by the matrix. To date these switches have been for the most part of the electro-magnetic type, such as relays, since these have proven reliable and experience with them has been good.

The introduction of electronic equipment into modern telephone systems for path selection in telephone matrices has permitted telephone connections to be established much faster than previously obtainable with older systems, thus providing telephone subscribers with better and more reliable service. The speed of the overall system, however, in establishing a connection is limited by any slow operating components involved in the connection, which in the case of modern telephone systems directly relates to electro-magnetic crosspoint switches. These type switches detract from the overall speed of establishing a telephone connection since they contain moving parts which make them inherently slower than purely electronic switches which require no physical movement. Since a number of crosspoint switches are required in establishing any telephone connection, improving the speed of operation of these switches provides an opportunity for improving the overall speed of operation of the system. By replacing electro-magnet crosspoint switches with solid state crosspoint switches the actual switching functions performed by the switching matrix can be speeded up so as to be more compatible with the faster path selecting speeds encountered in the electronic equipment in modern telephone switching systems. This would then improve the overall speed of the telephone switching system.

It is therefore an object of the present invention to provide a new and improved solid state crosspoint switch.

It is also an object of this invention to provide a new and improved solid state crosspoint switch that is particularly adaptable for manufacture as part of a solid state matrix using integrated circuit techniques.

It is also an object of this invention to provide a new and improved solid state crosspoint switch for providing faster switching times than presently available with electro-magnetic switches.

An important design consideration in solid state crosspoint switches is the leakage capacitance of the semiconductor components which creates undesirable paths for crosstalk viz. audio signals from one telephone connection passing through the leakage capacitance of an open crosspoint switch into another telephone connection thereby interfering with the conversation taking place through the latter connection. It is therefore another important object of the present invention to provide a new and improved solid state crosspoint switch which substantially eliminates crosstalk.

A further object of the invention is to provide a solid state crosspoint switch which displays substantially constant current minimal power demands, particularly during the times that the switch is disabled.

Still a further object of the invention is to provide a solid state crosspoint switch with low insertion loss so as to minimize the attenuation of audio signals which pass therethrough.

These objects as well as others and the means of achieving them will become readily apparent from the figures and the detailed description of the invention hereinbelow.

BRIEF DESCRIPTION OF THE INVENTION

Each input lead pair of a telephone switching matrix is interconnected with each output lead pair of the matrix through a solid state crosspoint switch of the invention, each input and respective output lead being linked through the collector-emitter path of a different switching transistor. A low impedance path for passing audio signals between a selected input and output lead pair is established by driving the two switching transistors associated therewith into saturation from a gated control circuit responsive to appropriate control signals. At all other times a high impedance path is maintained for blocking audio signals by driving the two switching transistors into cutoff. Crosstalk is substantially eliminated by combining two compensating transistors, which are driven into cutoff with the two switching transistors in a balanced bridge configuration so that when the crosspoint switch is open (in a figurative sense) audio signals passing through the switch via the leakage capacitance of the switching transistors are cancelled out by equal and opposite audio signals passing through the leakage capacitance of the associated compensating transistors.

The biasing arrangement for the switching transistors includes a current regulating circuit which interposes a high impedance between the matrix path and the control circuit thus providing sufficient isolation between the two to ensure low insertion loss and reducing the likelihood that the control circuit will be falsely tripped by spurious signals from the telephone connection.

PREFERRED EMBODIMENT OF THE INVENTION

The solid state crosspoint switch of the invention is advantageously designed to be used in a matrix for establishing a low impedance electrical path for passing audio signals between a selected one of a plurality of input leads and a selected one of a plurality of output leads. The crosspoint switch is disclosed herein in connection with a telephone switching system merely for purposes of illustration which is not intended to limit its scope of operation. It will be readily apparent to those familiar with the state of the art that the switch is adaptable for use in estabishing other types of low impedance electrical connections and therefore is not to be construed as being restricted to telephone systems.

Figure 1:
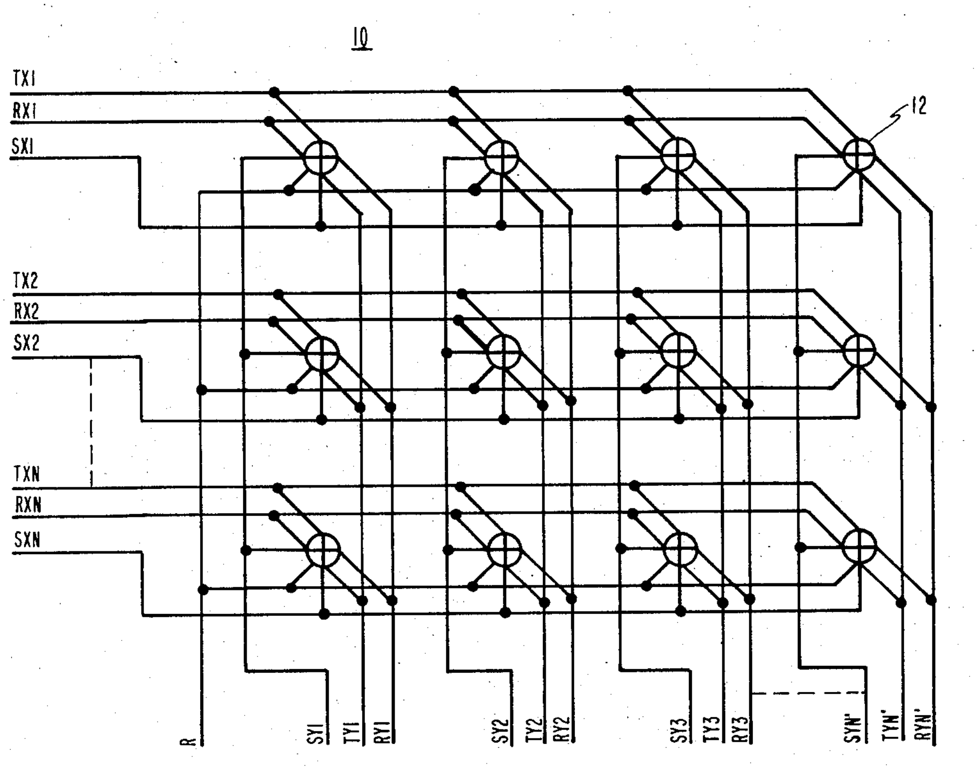
FIG. 1 illustrates a telephone switching matrix utilizing an array of the solid state crosspoint switches of the invention.

FIG. 1 illustrates a telephone switching matrix 10 which comprises an array of the solid state crosspoint switches 12 wherein each individual switch 12 interconnects a particular pair of horizontal tip and ring leads TX and RX, respectively, with a particular pair of vertical tip and ring leads TY and RY, respectively. There are N pairs of horizontal leads TX and RX and N' pairs of vertical leads TY and RY, and the matrix is arranged so that any one of the former can be connected to any one of the latter via a low impedance path by selectively enabling the appropriate crosspoint switch 12. Either of the horizontal or vertical lead pairs involved in a connection can constitute an input lead pair with the other constituting an output lead pair.

Figure 2:
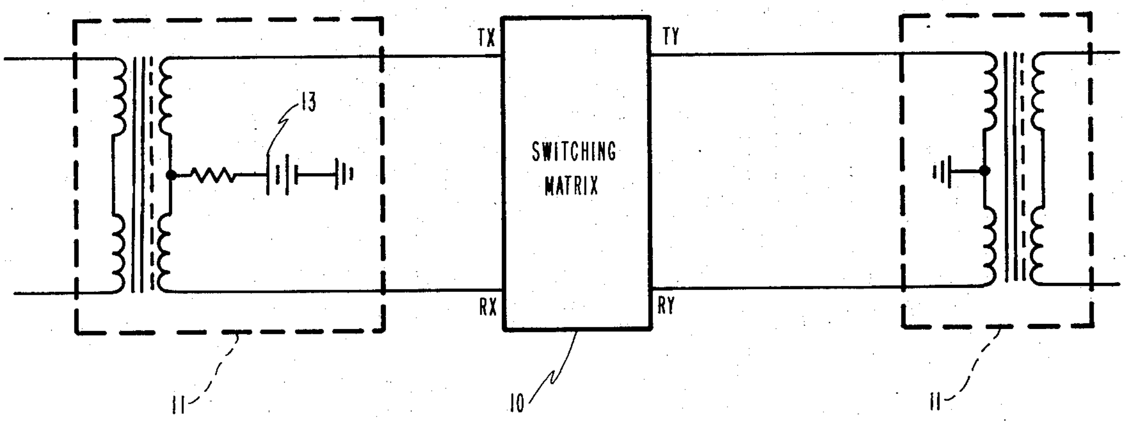
FIG. 2 shows a single tip and ring line connection to the matrix of FIG. 1.

The switching matrix 10 would ordinarily be used in conjunction with establishing an audio path between subscribers via the tip and ring leads in a telephone switching system. For instance, the matrix 10 is shown in FIG. 2 as interconnecting the tip (TX and TY) and ring (RX and RY) leads of a single connection including two balanced transformer bridges 11 onto which audio signals are transposed. Direct current power is supplied from a battery 13 connected between the center tap of the windings of the transformer bridges 11. This type of arrangement is well known in the art and it is illustrated to facilitate the reader's understanding of how the matrix 10 might fit into an overall telephone switching system.

In normal operation, each crosspoint switch 12 provides a high impedance path between the horizontal and vertical lead pair it interconnects, thereby effectively blocking the passage of any audio signal and DC current flow therethrough. When it is desired to pass an audio signal between a particular horizontal lead pair TX and RX and a particular vertical lead pair TY and RY, respectively, the appropriate crosspoint switch 12 is selectively enabled by simultaneously applying appropriate control signals to a horizontal control lead SX and a vertical control lead SY, which are uniquely associated with that particular crosspoint switch 12 chosen for operation. Each horizontal lead pair TX and RX has an individual horizontal control lead SX associated therewith, there being N such leads and each vertical lead pair TY and RY has an individual vertical control lead SY associated therewith, there being N' such leads (FIG. 1). Consequently, any crosspoint switch 12 can be selectively enabled by applying control signals to the horizontal and vertical control leads uniquely associated therewith. Each of the control signals consists of a single momentary pulse which once applied on the horizontal and vertical control leads SX and SY, respectively, actuates the switch 12 and is thereafter removed leaving the switch 12 in a low impedance state. When it is desired to restore the high impedance connection, the switch 12 is disabled by applying the same control signals to the same horizontal and vertical control leads SX and SY, respectively, and in addition, by applying a control signal to a lead R which is connected to all the crosspoint switches 12. This will be explained more fully hereinafter.

Figure 3:
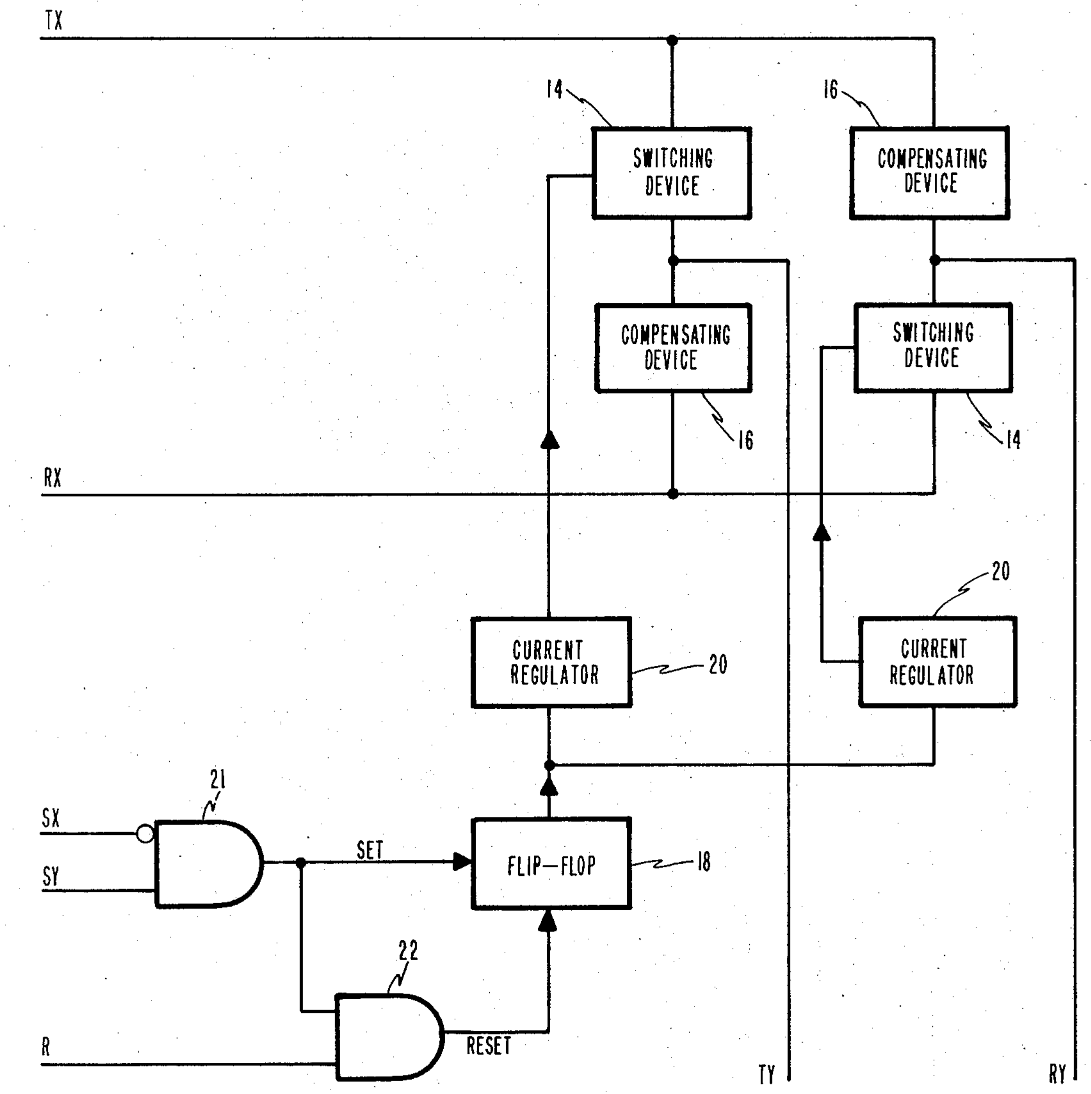
FIG. 3 is a block diagram representation of the solid state crosspoint switch.

Before describing in detail the operation of the crosspoint switch 12, it is appropriate to first describe the operation of the switch functionally. Referring to FIG. 3, it is seen that the crosspoint switch 12 comprises a number of functional components. Each horizontal and vertical tip and ring lead (TX and TY, RX and RY) is interconnected, respectively, through a switching device 14 which performs the actual high impedance and low impedance switching operations. Connected between each horizontal ring lead RX and vertical tip lead TY and between each horizontal tip lead TX and vertical ring lead RY is a compensating device 16, which functions to substantially eliminate crosstalk. The switching devices 14 are controlled by a flip-flop device 18 via current regulating devices 20. The flip-flop device 18 receives its intelligence from a circuit which can be represented as a gating circuit consisting of two AND gates 21 and 22 to which the aforementioned control signals are applied.

Figure 4:
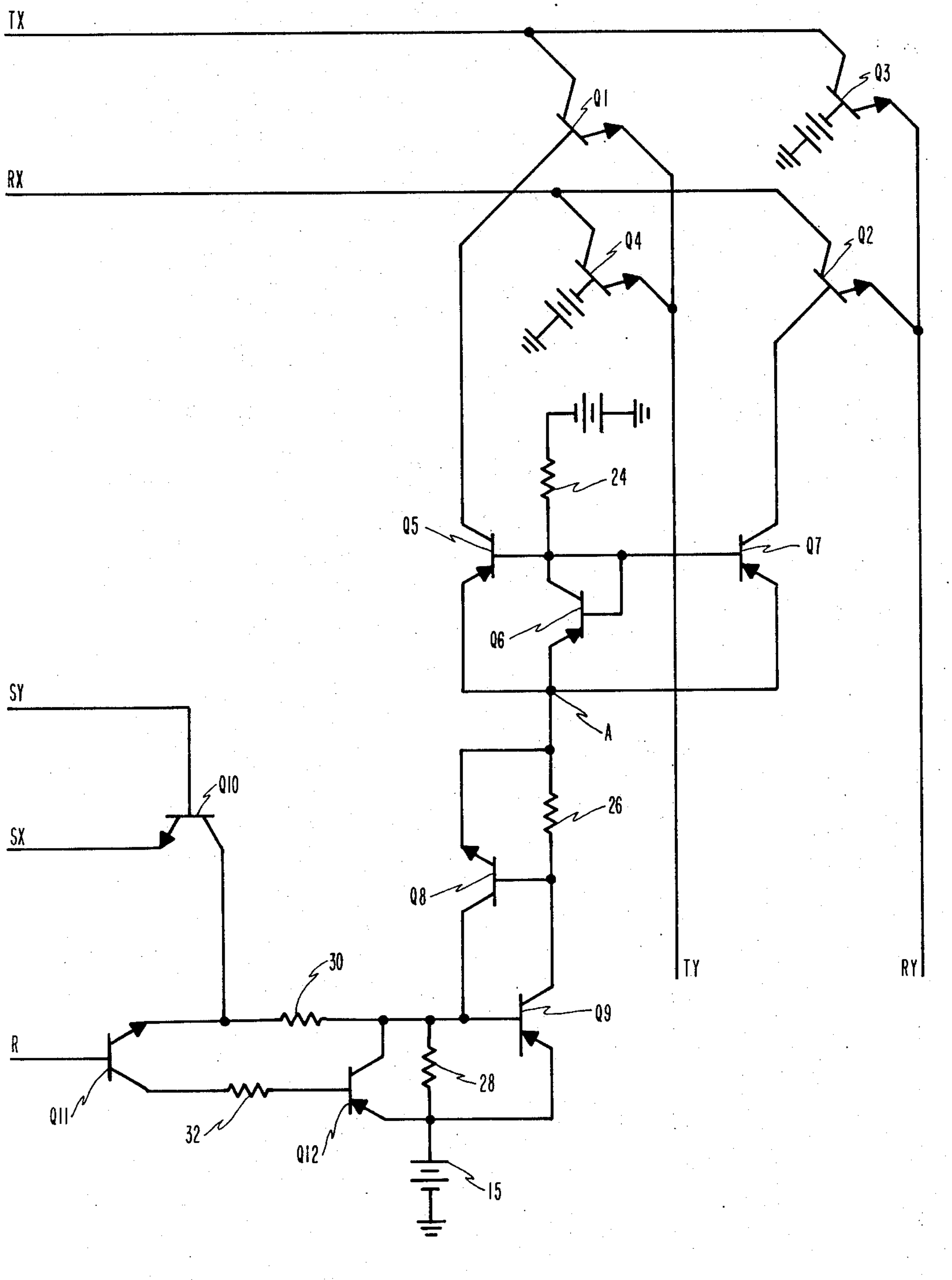
FIG. 4 is a detailed schematic diagram of the solid state crosspoint switch.

Having explained the operation of the crosspoint switch 12 generally, it will now be discussed in detail. As shown in FIG. 4, the horizontal tip lead TX is connected to the vertical tip lead TY through the collector-emitter path of a switching transistor Q1. Similarly, the horizontal ring lead RX is connected to the vertical ring lead RY through the collector-emitter path of another switching transistor Q2. These transistors Q1 and Q2 perform the actual impedance switching functions of the crosspoint switch 12, that is to say, when they are forward-biased, they are driven into saturation which provides a low impedance path between the respective tip and ring leads which they interconnect and when they are reverse biased, they are driven into cutoff, thus, providing a very high impedance path between the respective tip and ring leads. Consequently, audio signals and DC currents can pass through the collector-emitter paths of transistors Q1 and Q2 only when these transistors are forward-biased. The biasing current provided by the battery 13 assures that the crosspoint is properly energized so that the collector-emitter paths conduct both the negative and positive half cycles of the audio signal.

The horizontal tip lead TX is also connected to the vertical ring lead RY through the collector-emitter path of a compensating transistor Q3 which is reverse-biased so that it always operates in the cutoff region. Similarly, the horizontal ring lead RX is connected to the vertical tip lead TY through another compensating transistor Q4 which is also reverse-biased driving this transistor into cutoff. The four transistors Q1–Q4 are all designed to have the same characteristics so that they form a balanced bridge when the transistors Q1 and Q2 are cut off. Such an arrangement can be easily accomplished by forming all four transistors on a single chip by using integrated circuit techniques. The audio signals appearing on the horizontal tip lead TX and on the horizontal ring lead RX at any given time (with respect to ground) are of equal magnitude and opposite polarity because of the nature of the balanced input circuit configuration (see FIG. 2). Thus, any signal which passes from lead TX to lead TY through the leakage capacitance of the transistor Q1, which it is assumed is operating as a high impedance switch (transistors Q1 and Q2 cutoff) at this time, will be offset by the equal, but opposite, signal which passes from RX to TY through the leakage capacitance of the cutoff transistor Q4. Since these transistors have similar characteristics, including their leakage capacitance, no signal appears on the vertical tip lead TY. Similarly, no signal appears on the vertical ring lead RY because of the same cancellation effect provided by transistors Q2 and Q3. The foregoing is also true for audio signals emanating on the vertical leads TY and RY, viz. no signal will appear on the horizontal leads TX and RX while the crosspoint switch 12 is disabled. Thus, crosstalk is substantially eliminated in the matrix crosspoint switches while operating in a high impedance state. When the crosspoint switch 12 is enabled, the magnitude of the audio signals through the low impedance of transistors Q1 and Q2 so greatly exceeds the magnitude of the signals through the high impedance leakage capacitance of transistors Q4 and Q3 that signal attenuation is insignificant and of no consequence.

The bases of transistors Q1 and Q2 are connected to the collectors of a pair of transistors Q5 and Q7, respectively. The emitters of transistors Q5 and Q7 are connected in common to the emmitter of another transistor Q6 at point A of FIG. 4. The base and collector of transistor Q6 are connected to the bases of transistors Q5 and Q7 as well as to a forward biasing potential via a resistor 24. In this configuration, the transistor Q6 acts very much like a diode maintaining a substantially constant voltage across the base-emitter junctions of transistors Q5 and Q7, which is such as to cause their collector current to be equal to that of transistor Q6. The transistors Q5, Q6 and Q7 can be made from the same chip, so that any changes in the characteristics of the transistor Q6 as a result of temperature change will equally affect transistors Q5 and Q7. In this manner, the combination of transistors Q5, Q6 and Q7 provides a regulated current so that the current passing through the collector-emitter junctions of transistors Q5 and Q7 to the respective bases of transistors Q1 and Q2 remains fairly constant. When the crosspoint switch 12 is disabled, the base-collector junctions of transistors Q5 and Q7 provide a low voltage drop path via resistor 24 from a reverse bias potential to the bases of transistors Q1 and Q2 for driving them into cutoff.

The emitters of transistors Q5, Q6 and Q7 are connected to the emitter of another transistor Q8 and to the base of Q8 through a resistor 26. The collector transistor Q8 is connected to the base of a transistor Q9 and the base of transistor Q8 is connected to the collector of the transistor Q9. The emitter of Q9 is connected directly to a DC power source 15 while its base is connected to the DC power source 15 through a resistor 28. Once transistor Q9 is rendered conductive, it supplies forward bias current to transistor Q8 for maintaining transistor Q8 conductive. The current through the collector-emitter path of transistor Q8 passing through resistor 28 provides a forward bias potential across the base emitter junction of transistor Q9 maintaining transistor Q9 conductive. Thus transistors Q8 and Q9 remain conductive after transistor Q9 is enabled until transistor Q9 is disabled. These two transistors Q8 and Q9 function as a complementary flip-flop device, remaining on once turned on (set) and remaining off once turned off (reset). A portion of the current through these two transistors Q8 and Q9 flows through the bases of transistors Q1 and Q2, via transistors Q5 and Q7 thereby providing a forward bias for enabling the crosspoint switch 12, resulting in a low impedance path for interconnecting horizontal leads TX and RX with vertical leads TY and RY, respectively.

The transistor Q9 is initially turned on by the flow of current through resistor 28 and another resistor 30 and the collector-emitter path of another transistor Q10 whenever transistor Q10 is rendered conductive. Transistor Q10 is rendered conductive momentarily by a positive pulse applied to its base via one of the vertical control leads SY connected thereto and a ground pulse applied to its emitter via one of the horizontal control leads SX. After transistor Q9 is enabled, the control pulses are terminated which disables transistor Q10 but leaves transistors Q8 and Q9 conductive so that the crosspoint switch 12 remains enabled.

To disable the transistor Q9, transistor Q10 is rendered conductive as before by the application of a positive pulse to its base via lead SY and a negative pulse to its emitter via lead SX, and, in addition, another transistor Q11 is enabled by the application of a positive pulse to its base via a lead R. Rendering transistors Q10 and Q11 conductive simultaneously permits current to flow through the base-emitter junction of another transistor Q12 via a resistor 32 connected in series with the base of transistor Q12 and the collector-emitter path of transistor Q11. This current forward biases transistor Q12, thus, effectively short circuiting resistor 28 since resistor 28 is connected across the collector-emitter path of transistor Q12. During this time, little, if any, potential can be developed across the base-emitter junction of transistor Q9 to maintain it forward-biased. Transistor Q9 is thus rendered non-conductive which deprives transistor Q8 of the base current necessary to maintain it conductive. Thus, transistor Q8 is also rendered non-conductive. As long as the control pulses applied to transistor Q10 are coincident with one another, and with the same time period as the control pulse applied to transistor Q11, transistors Q8 and Q9 will remain cut off when all three control pulses are terminated. With transistors Q8 and Q9 disabled, no current is available to forward bias transistors Q1 and Q2, thus resulting in their cutoff which causes the crosspoint switch 12 to remain in a high impedance state. The inherent delay in transistor Q12 turning off subsequent to the turning off of transistors Q10 and Q11, ensures that the switch 12 remains in this state after the three coincident pulses are terminated.

The only time substantial current is drawn by the solid state crosspoint switch 12 control circuit is during the pulsing operation to set or reset the complementary flip-flop 18 consisting of transistors Q8 and Q9. The setting of this flip-flop 18 enables the switch 12 while its resetting disables the switch 12. While the switch 12 is disabled, only leakage current is drawn through the reverse-biased transistors Q1–Q4. When the switch 12 is enabled, the only current drawn after termination of the pulsing operation is that necessary to forward bias transistors Q1 and Q2 and Q5–Q7 and reverse-bias transistors Q3 and Q4. Once in either state, the crosspoint switch 12 requires very little current to maintain it in that state. Furthermore, since only one crosspoint switch is ever operated at a time (set or reset), rather than a group of crosspoint switches, the power demands are even more reduced. Thus, the matrix power requirements are minimal.

Another major advantage of the crosspoint switch 12 lies in the means through which its state is changed, namely, through signal pulses applied to a gating circuit which is essentially isolated from the actual switching devices (transistors Q1 and Q2). Unlike prior art switches with built in latching mechanisms, there is little, if any, liklihood that noise, particularly in the tip and ring conductors of telephone lines will cause false operation of the switch. This is true because there is no low AC impedance path between the tip and ring leads through the switch and the gating circuit which performs the control functions. The foregoing also results in low insertion loss so that the AC load imposed on the audio path by the switch is small, thus, avoiding audio signal attenuation.

Figure 5:
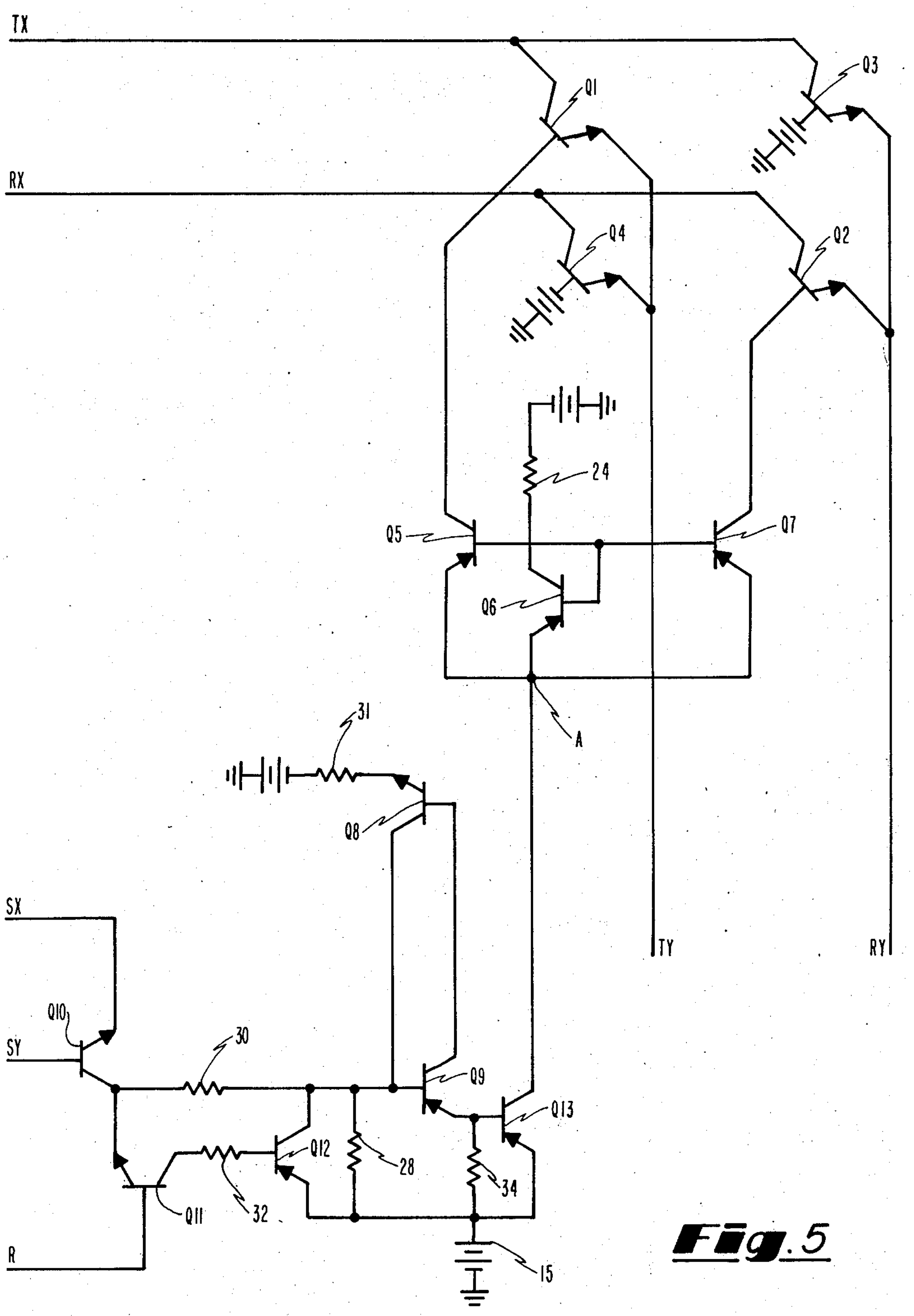
FIG. 5 is another detailed schematic diagram of the solid state crosspoint switch having a modified control circuit over that shown in FIG. 4.

If even more isolation is desired between the switching devices (Q1 and Q2) and the gated control circuit, then the latter can be modified by providing an additional transistor Q13 and a biasing resistor 34 between the control circuit and point A as shown in FIG. 5. In this embodiment, the complementary flip-flop 18 consisting of transistors Q8 and Q9 is not connected directly to the current regulating transistors Q5, Q6, and Q7, but rather controls transistor Q13 which is so directly connected. When the flip-flop 18 is turned on as before, it renders transistor Q13 conductive via resistor 34 which enables the crosspoint switch 12 and when the flip-flop 18 is turned off as before, it cuts off transistor Q13 via resistor 34 disabling the crosspoint switch 12. Resistor 26 of FIG. 4, which is eliminated in this configuration, is replaced by a resistor 31 connected between a forward biasing potential and the emitter of transistor Q8. The control pulses for turning the flip-flop 18 on and off are applied in the same manner in this embodiment as in that previously explained.

A major advantage of the crosspoint switch 12 relates to the fast turn-on and turn-off times of the complementary flip-flop 18 which permits short pulses to be used for controlling its switching operations. The fast response times broaden the applications of the crosspoint switch 12. Furthermore, the compensating devices 16, which substantially eliminate the leakage capacitive effect of the crosspoint switch makes it suitable for broad bandwidth applications.

It should be noted that the entire crosspoint switch, including all transistors and resistors, can be made from a single integrated ciruit chip, thus affording manufacturing convenience and economy. The switching matrix would then be made by combining the individual chips in whatever pattern is desired. Alternatively the entire matrix could be formed on a single chip, which of course would be much larger than the chip required for a single cross-point switch.

Many variations of control circuits utilizing various control signals will be readily apparent to those familiar with the state of the art for enabling and disabling the solid state crosspoint switch of the invention. It is impracticable if not impossible to describe them all presently. It should be realized however that their omission herein is in no way intended to detract from the scope and spirit of the subject invention. Furthermore, the disclosure of the invention in terms of switching and compensating devices comprised of transistors is merely illustrative and does not preclude the use of other types of semiconductor devices such as field effect transistors for accomplishing the same objectives.

What is claimed is:

1. A solid state crosspoint switch for interconnecting a first and second lead with a third and fourth lead, respectively, comprising:

four semiconductor devices, each having a controllable current path poled for conducting current in the same direction through the interconnection and a control terminal for controlling the amount of current flow therethrough the current path of a first one of said devices being connected between the first and third leads, the current path of a second one of said devices being connected between the second and fourth leads, the current path of a third one of said devices being connected between the first and fourth leads, and the current path of the fourth one of said devices being connected between the second and third leads;

control circuit means connected to the control terminals of said first and second semiconductor devices responsive to switching signals for enabling or disabling both current paths thereof simultaneously, said control circuit means including high impedance current regulating means for providing a substantially fixed current when enabling said first and second semiconductor devices, and circuit means connected to the control terminals of said third and fourth devices for disabling the current paths thereof.

2. The solid state switch of claim 1 wherein said control circuit means is repsonsive to a first switching signal for enabling said first and second semiconductor devices.

3. The solid state switch of claim 2 wherein said first switching signal consists of at least one momentary pulse.

4. The solid state switch of claim 2 wherein said control circuit means is responsive to a second switching signal for disabling said first and second semiconductor devices.

5. The solid state switch of claim 4 wherein said second switching signal consists of at least two coincident momentary pulses.

6. The solid state switch of claim 4 wherein said control circuit means includes storage circuit means which is set by said first switching signal and reset by said second switching signal for respectively enabling and disabling said first and second semiconductor devices.

7. The solid state switch of claim 4 wherein said control circuit means drives said first and second semiconductor devices into saturation in response to said first switching signal and into cutoff in response to said second switching signal.

8. A solid state crosspoint switch for respectively interconnecting the tip and ring leads of two balanced telephone circuits used in translating audio signals through a telephone switching network, comprising:

four semiconductor devices, each having a controllable current path poled for conducting current in the same direction through the interconnection and a control terminal for controlling the amount of current flow therethrough, the current path of a first one of said devices being connected between the tip leads of the two circuits, the current path of a second one of said devices being connected between the rings leads of the two circuits, the current path of a third one of said devices being connected between the tip lead of one of the two circuits and the ring lead of the other circuit and the current path of the fourth one of said devices being connected between the ring lead of the first mentioned circuit and the tip lead of the other circuit;

control circuit means connected to the control terminals of said first and second semiconductor devices for providing two control states for enabling or disabling both current paths thereof simultaneously, said control circuit means including high impedance current regulating means for providing a substantially fixed current when enabling said first and second semiconductor devices;

switching circuit means for changing the state of said control circuit means in response to switching pulses applied thereto including storage circuit means for maintaining said state until the next switching pulse is received, and control circuit means connected to the control terminals of said third and fourth semiconductor devices for disabling the current paths thereof.

9. The solid state crosspoint switch of claim 1 wherein said control circuit means includes a flip-flop which is set to enable said regulating means and reset to disable said regulating means and first and second switching circuits, said first switching circuit being responsive to a first switching signal for setting said flip-flop and said second switching circuit being responsive to a second switching signal in the presence of the first switching signal for resetting said flip-flop.

10. The solid state crosspoint switch of claim 8 wherein said control circuit means includes a flip-flop which is set to enable said regulating means and reset to disable said regulating means and first and second switching circuits, said first switching circuit being responsive to a first switching signal for setting said flip-flop and said second switching circuit being responsive to a second switching signal in the presence of the first switching signal for resetting said flip-flop.

* * * * *